(12) United States Patent
Martch

(10) Patent No.: US 10,404,801 B2
(45) Date of Patent: Sep. 3, 2019

(54) RECONFIGURING REMOTE CONTROLS FOR DIFFERENT DEVICES IN A NETWORK

(75) Inventor: Henry Gregg Martch, Parker, CO (US)

(73) Assignee: DISH Technologies L.L.C., Englewood, CO (US)

( * ) Notice: Subject to any disclaimer, the term of this patent is extended or adjusted under 35 U.S.C. 154(b) by 1550 days.

(21) Appl. No.: 13/292,028

(22) Filed: Nov. 8, 2011

(65) Prior Publication Data

US 2013/0117384 A1    May 9, 2013

(51) Int. Cl.
| G06F 15/177 | (2006.01) |
| H04L 29/08 | (2006.01) |
| G08C 17/02 | (2006.01) |
| G08C 23/04 | (2006.01) |
| H04W 4/80 | (2018.01) |
| H04W 4/04 | (2009.01) |

(52) U.S. Cl.
CPC ............ *H04L 67/125* (2013.01); *G08C 17/02* (2013.01); *G08C 23/04* (2013.01); *H04W 4/80* (2018.02); *G08C 2201/20* (2013.01); *H04W 4/04* (2013.01)

(58) Field of Classification Search
CPC ................ G08C 2201/21; G08C 23/04; G08C 2201/20; H04N 2005/4442; H04N 21/42207; H04N 21/42221; H04N 21/42226; H04N 2005/4444; H04N 21/42204; H04N 5/4403
USPC ........................................................ 709/206
See application file for complete search history.

(56) References Cited

U.S. PATENT DOCUMENTS

| 9,310,976 | B2 | 4/2016 | Huang et al. |
| 2004/0070491 | A1 | 4/2004 | Huang et al. |
| 2006/0047513 | A1 | 3/2006 | Chen |
| 2006/0109112 | A1* | 5/2006 | Haines ..................... 340/539.32 |

(Continued)

FOREIGN PATENT DOCUMENTS

| CN | 101902597 A | 12/2010 |
| EP | 1 469 699 A1 | 10/2004 |
| TW | I334703 B | 12/2010 |

OTHER PUBLICATIONS

International Search Report, dated Mar. 29, 2013 for International application No. PCT/US2012/063268, 2 pages.

(Continued)

*Primary Examiner* — Phuoc H Nguyen
(74) *Attorney, Agent, or Firm* — Seed IP Law Group LLP

(57) ABSTRACT

A control device transmits a first type of signal and a second type of signal as part of transmitting an instruction. An electronic device receives the first signal and determines the control device is paired with another device. The electronic device displays a notification indicating such as well as a prompt requesting confirmation to pair the control device. Upon receiving an affirmative response, the electronic device notifies the other device, which transmits unpairing information to the control device. The control device then unpairs from the other device. The other device also transmits pairing information to the control device via the electronic device and the control device utilizes the information to pair with the electronic device. In some implementations, the other device may receive a request to locate the control device. In response, the other device displays that the control device has been paired with the electronic device.

12 Claims, 13 Drawing Sheets

(56) References Cited

U.S. PATENT DOCUMENTS

| | | | |
|---|---|---|---|
| 2008/0157993 A1* | 7/2008 | Du Breuil et al. | 340/825 |
| 2009/0051823 A1 | 2/2009 | Tsurumoto et al. | |
| 2009/0146779 A1* | 6/2009 | Kumar et al. | 340/5.31 |
| 2010/0052870 A1 | 3/2010 | King | |
| 2010/0328132 A1 | 12/2010 | Reams et al. | |
| 2011/0083147 A1 | 4/2011 | Ergen et al. | |
| 2011/0090408 A1 | 4/2011 | Ergen et al. | |
| 2011/0273625 A1* | 11/2011 | McMahon et al. | 348/734 |

OTHER PUBLICATIONS

Extended European Search Report, dated May 8, 2015, for corresponding European Application No. 12848644.6-1853 / 2777293, 6 pages.

* cited by examiner

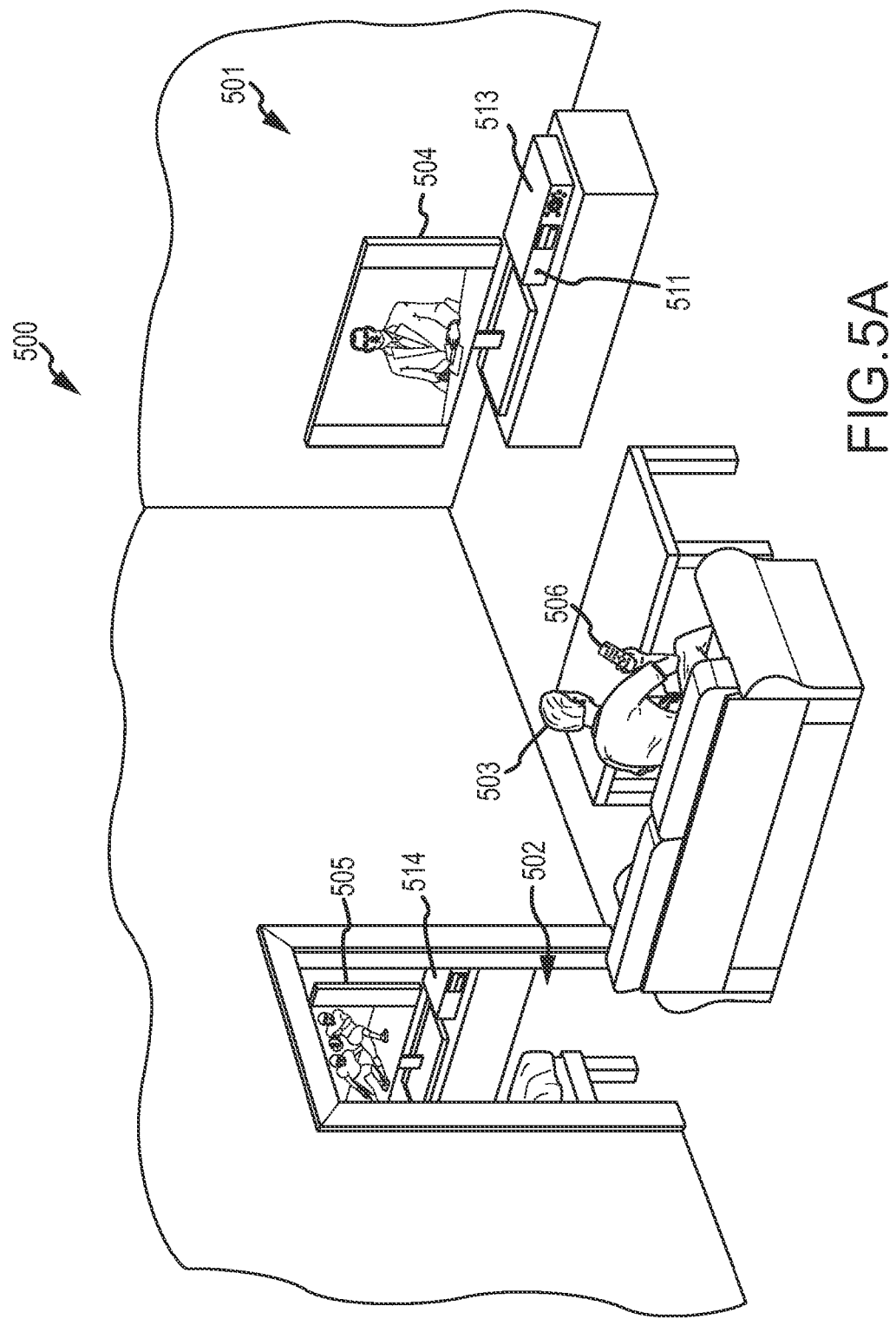

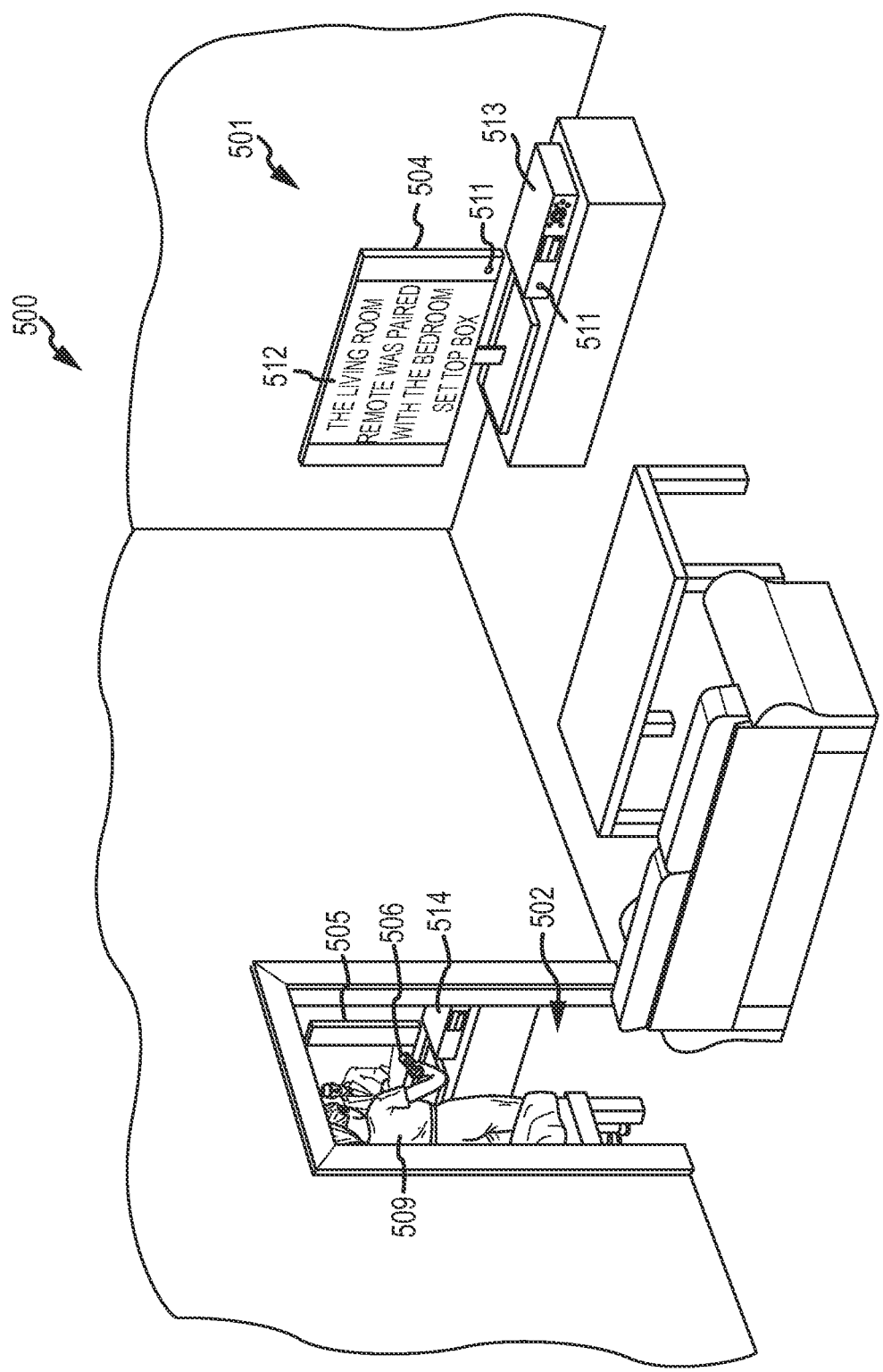

RECONFIGURING REMOTE CONTROLS FOR DIFFERENT DEVICES IN A NETWORK

FIELD OF THE INVENTION

This disclosure relates generally to remote controls, and more specifically to reconfiguring remote control devices for different electronic devices in a network.

SUMMARY

The present disclosure discloses systems and methods for reconfiguring remote control devices for different electronic devices in a network. A control device, such as a remote control, may transmit a plurality of signals including a first signal of a first type and a second signal of a second type as part of instructing an electronic device of a network of electronic device. The first type of signal may be a signal such as an infrared signal that has a shorter range than the second type of signal, which may be a signal such as a radio frequency signal. As such, an electronic device may receive the first signal if the electronic device is located in the same area of a location as the control device (e.g., the first signal may be limited to within a single room in a house) whereas the electronic device may receive the second signal as long as the electronic device is in the same location (e.g., the second signal may be received throughout the house) as the control device. If an electronic device receives the first signal of the plurality of signals from the control device (i.e., the electronic device is located within sufficient proximity of the control device), the electronic device may determine that the control device is currently paired with another electronic device of the network.

If the electronic device determines that the control device is currently paired with another electronic device, the electronic device may display a notification indicating such. The electronic device may also display a prompt requesting confirmation as to whether or not to pair the control device with the electronic device. If the electronic device receives an affirmative response to the prompt, the electronic device may notify the other electronic device that the pairing will be changed.

The other electronic device may transmit unpairing information to the control device upon receiving the notification. The control device may then unpair from the other electronic device. The other electronic device may also transmit pairing information to the control device and the control device may utilize the pairing information to pair with the electronic device. The other electronic device may transmit the pairing information to the control device via the electronic device and the electronic device may also transmit control information for components associated with the electronic device. The control device may utilize the information to pair with the electronic device.

In some implementations, the other electronic device may receive a request to locate the control device after the control device has paired with the electronic device. In response, the other electronic device may present a message that the control device has been paired with the electronic device. A user attempting to locate the control device may then seek the control device in the vicinity of the electronic device.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure.

Together, the descriptions and the drawings serve to explain the principles of the disclosure.

BRIEF DESCRIPTION OF THE DRAWINGS

FIGS. 5A-5I are diagrams illustrating a user utilizing a system for reconfiguring remote control devices for different electronic devices in a network. The system may be the system of FIG. 1.

DETAILED DESCRIPTION OF THE EMBODIMENTS

Figure 1:
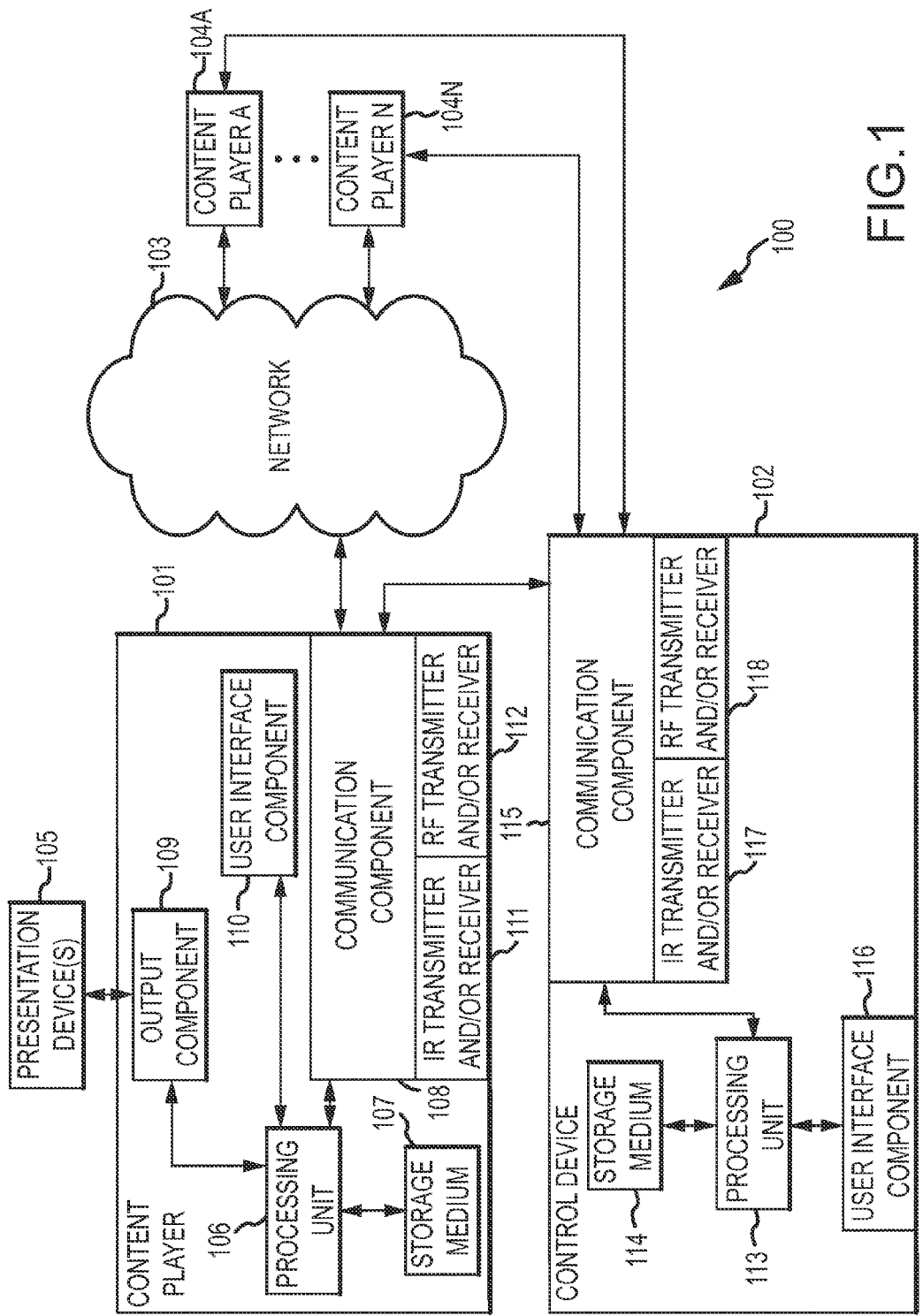
FIG. 1 is a block diagram illustrating a system for reconfiguring remote control devices for different electronic devices in a network.

The description that follows includes sample systems, methods, and computer program products that embody various elements of the present disclosure. However, it should be understood that the described disclosure may be practiced in a variety of forms in addition to those described herein.

Electronic devices may include a variety of different devices, such as content players (such as set top boxes, television receivers, digital video recorders, television tuners, digital music players, desktop computers, laptop computers, cellular telephones, smart phones, mobile computing devices, and so on) may present content via one or more presentation devices (such as computer monitors, televisions, cathode ray tube displays, liquid crystal displays, speakers, printers, and/or other such devices for presenting content), computing devices, electronic kitchen appliances, vehicles, and so on. Such electronic devices may perform a variety of different user-directed and/or automatic functions. In the case of content players, the content that such content players may present may be stored by the content player and/or may be received from one or more content providers (such as one or more television programming providers, video on demand providers, pay per view movie providers, digital music providers, and so on) via one or more communication links (such as one or more satellite communication links, coaxial cable communication links, WiFi communication links, Internet protocol communication links, and so on). The operations of various electronic devices, such as the example of the content players, may be controlled via one or more control devices, such as one or more remote control devices.

In some cases, control devices may be dedicated to a particular electronic device. However, in other cases, a single control device may be configured to control one or more of a number of different electronic devices at a particular time. For example, a number of different electronic devices may be arranged (such as configured to communicate via one or more wired and/or wireless networks) within a particular location (such as in different rooms of a home and/or other building). A control device may be configured such that the control device may be utilized to control any one of the different electronic devices at a particular time. This may be accomplished by pairing the control device with the particular electronic device that the control device is to control. In order to utilize the control device to control a different electronic device, the control device may be unpaired from the electronic device with which the control device is currently paired and then paired with the different electronic device.

In some cases, pairing a control device with an electronic device may involve one or more complicated and burdensome operations. A user may have to specifically initiate pairing and manually configure the control device and/or the electronic device in order to pair the control device with the electronic device. Such manual configuration may be complex and burdensome for users. Further, the control device may be configured to control one or more components associated with the electronic device (such as one or more video cassette recorders, digital video disk players, video game consoles, audio amplifiers, and/or any other component that may be utilized in combination with such an electronic device) when the control device is paired with the electronic device. Manually configuring such associated components to be also controlled by the control device may also be very complex and burdensome for users.

The present disclosure discloses systems and methods for reconfiguring remote control devices for different electronic devices in a network. A control device, such as a remote control, may transmit a plurality of signals as part of instructing an electronic device of a network of electronic device. The plurality of signals may include a first signal of a first type (such as an infrared signal) and a second signal of a second type (such as a radio frequency signal). The first type of signal may have a shorter range than the second type of signal such that a receiving electronic device may need to be located in the same area of a location (e.g., the first signal may be limited to within a single room in a house) as the control device to receive the first signal whereas the electronic device may receive the second signal as long as the electronic device is in the same location (e.g., the second signal may be received throughout the house) as the control device.

If an electronic device receives the first signal of the plurality of signals from a control device (i.e., the electronic device is located in the same area as the control device), the electronic device may determine that the control device is currently paired with another electronic device of the network. If so, the electronic device may display a notification that the control device is paired with the other electronic device and/or a prompt requesting confirmation to pair the control device with the electronic device. Upon receipt of an affirmative response, the electronic device may notify the other electronic device that the pairing will be changed. The other electronic device, upon receipt of the notification, may transmit unpairing information to the control device and the control device may unpair from the other electronic device. The other electronic device may also transmit pairing information to the control device (which may be transmitted via the electronic device) and the control device may utilize the pairing information to pair with the electronic device. The electronic device may also transmit one or more command codes for controlling other components associated with and/or located in the same proximity as the electronic device to the control device that the control device may utilize to control the other components. After pairing, the control device may be utilized to control the electronic device instead of the other electronic device without requiring manual initiation and/or configuration.

Further, the other electronic device may receive a request to locate the control device. In response, the other electronic device may present a message that the control device has been paired with the electronic device. As such, a user attempting to locate the control device may be able to search for the control device in the area of the electronic device as the control device was in use there more recently than with the other electronic device.

FIG. 1 is a block diagram illustrating a system 100 for reconfiguring remote control devices for different electronic devices in a network. The system 100 includes a content player 101 and content players A-N 104A-104N (which each may be any kind of content player such as a set top box, a television receiver, a digital video recorder, a television tuner, a digital music player, a desktop computer, a laptop computer, a cellular telephone, a smart phone, a mobile computing device, and/or any other kind of device operable to play content) that are communicably coupled by one or more networks 103 (which may be an Ethernet network, a coaxial cable network, a WiFi network, a HomePlug network, a MoCA® (Multimedia Over Coax Alliance) network, and/or any other kind of wired and/or wireless network that communicably connects the content player 101 and the content players A-N 104A-104N). The system may also include a control device 102 (such as a remote control) which may be paired with the content player 101 and/or the content players A-N 104A-104N in order to control the content player 101 and/or the content players A-N 104A-104N, respectively.

The content player 101 (and/or the content players A-N 104A-104N) may include one or more processing units 106, one or more non-transitory storage media 107 (which may take the form of, but is not limited to, a magnetic storage medium; optical storage medium; magneto-optical storage medium; read only memory; random access memory; erasable programmable memory; flash memory; and so on), one or more communication components 108 (which may include one or more infrared (IR) transmitters and/or receivers 111 and/or one or more radio frequency (RF) transmitters and/or receivers 112), one or more output components 109, and/or one or more user interface components 110. The processing unit 106 may execute instructions stored in the non-transitory storage medium 107 to transmit content (such as content stored in the non-transitory storage medium 107 and/or content being received via the communication component) to one or more presentation devices 105 (which may be any kind of presentation device such as a television, computer monitor, speaker, cathode ray tube display, liquid crystal display, plasma display, printer, and so on), via the output component. Further, the processing unit 106 may execute instructions stored in the non-transitory storage medium 107 to communicate with other content players connected to the network 103 and/or send signals to and/or receive signals from the control device 102 via the communication component 108 (and/or via the IR transmitter and/or receiver 111 and/or the RF transmitter and/or receiver 112).

The control device 102 may include one or more processing units 113, one or more non-transitory storage media 114, one or more communication components 115 (which may include one or more IR transmitters and/or receivers 117 and/or one or more RF transmitters and/or receivers 118), and/or one or more user interface components 116 (such as one or more buttons, track pads, and/or any other such selection element). The processing unit 113 may execute instructions stored in the non-transitory storage medium 114 to communicate with and/or control the content player 101 and/or the content players A-N 104A-104N, such as to pair or unpair with one of the content players and/or to transmit instructions to a content player with which the control device is paired. When transmitting instructions to control a content player with which the control device is paired (which may be performed automatically and/or in response to input received via the user interface component), the control device may transmit a first signal of a first type (such as an IR signal transmitted utilizing the IR transmitter and/or receiver 117) and a second signal of a second type (such as a RF signal transmitted utilizing the RF transmitter and/or receiver 118) to the respective content player via the communication component 115. The first type of signal may have a shorter range than the second type of signal (such as approximately twenty feet) such that a receiving content player may need to be located in the same area of a location (e.g., the first signal may be limited to within a single room in a house) as the control device to receive the first signal whereas the content player may receive the second signal as long as the content player is in the same location (e.g., the second signal may be received throughout the house) as the control device (such as within approximately one thousand feet).

If the content player 101 receives the first signal transmitted by the control device 102, the content player may determine whether or not the control device is currently paired with the content player. In some cases, the content player may make this determination based on looking up information included in the first signal in one or more databases shared between the content player and the content players A-N 104A-104N. In other cases, the content player may make this determination based on whether the content player receives the second signal and/or whether one of the content players A-N 104A-104N receives the second signal. If the content player determines that the control device is currently paired with the content player, the content player may perform one or more operations instructed by the first signal and/or the second signal.

However, if the content player 101 determines that the control device 102 is not currently paired with the content player, the content player may transmit a notification on the presentation device 105 via the output component 109 that indicates that the control device is paired with another content player. Such a notification may include one or more identifiers that identify the other content player. Additionally, the content player may transmit one or more prompts to the presentation device via the output component that request confirmation to pair the control device with the content player.

If one or more affirmative responses are received by the content player 101 (which may be submitted by the control device 102 in response to input received via the user interface component 116), the control device may transmit one or more notifications to the other content player with which the control device is currently paired to inform the other content player that the pairing request has been received. In response to the notification (and or receipt of the second signal of the second type but not the first signal of the first type), the other content player may transmit unpairing information to the control device and the control device may unpair from the other content player. The other content player may also transmit pairing information to the control device that the control device may utilize to pair with the content player. The other content player may transmit this pairing information to the control device via the content player and the content player may also transmit additional information such as one or more sets of command codes (such as IR command codes) to the control device to utilize to control one or more components (such as one or more displays, audio systems, and so on) associated with the content player. The control device may pair with the content player utilizing the pairing information and may transmit instructions (such as by transmitting further pluralities of signals of the first and second type) to the content player to control the content player and/or other components associated with and/or located in the same proximity as the content player.

The content player 101 may receive one or more requests to locate a control device (such as the control device 102) that was formerly paired with the content player but has been unpaired from the content player and paired with another content player (such as one of the content players A-N 104A-104N) in the manner described above. Such a request may be received via the user interface component 110. In response to such a request, the content player may determine that the last communication that the content player had with the control device was when the control device was paired with the other content player. As such, the content player may transmit a message to the presentation device 105 via the output component 109 that indicates that the control device was paired with the other content player. Such a message may include one or more identifiers that identify the other content player such that the requesting user may be able to go to the other content player to attempt to physically locate the control device.

Although the system 100 is illustrated and described above such that the first signal is an IR signal and the second signal is an RF signal, other signal types are possible. For example, the first signal may be a type of signal other than an IR signal that may be received by content players within a certain proximity to the control device (such as twenty feet) whereas the second signal may be a type of signal other than a RF signal that may be received by a content player paired with the control device that is outside of the certain proximity to the control device. Further, although the system 100 is illustrated and described such that the electronic devices are content players, it is understood that this is for the purposes of example. In other cases the electronic devices may be devices other than content players, such as electronic kitchen appliances, vehicles, lighting system components, and/or any other kind of electronic device capable of being connected to the network 103 and/or controlled by the control device 102.

Figure 2:
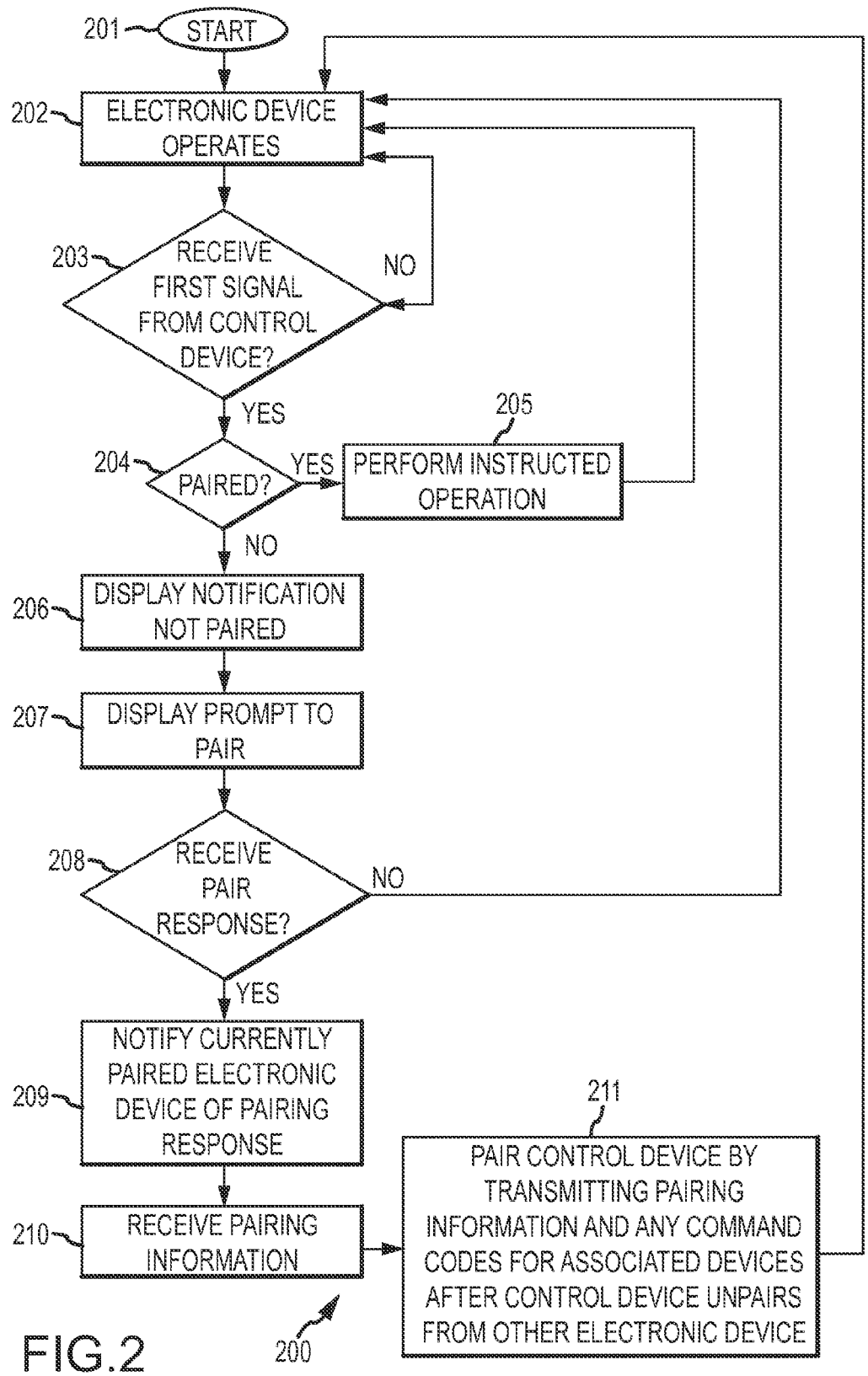
FIG. 2 is a flow chart illustrating a first example method for reconfiguring remote control devices for different electronic devices in a network. This method may be performed by the system of FIG. 1.

FIG. 2 illustrates a first example method 200 for reconfiguring remote control devices for different electronic devices in a network. The method 200 may be performed by the content player 101 of FIG. 1. The flow begins at block 201 and proceeds to block 202 where the electronic device (which may be the content player 101) operates. The flow then proceeds to block 203 where the electronic device determines whether or not a first signal of a first type is received from the control device that transmitted the first signal as part of a plurality of signals that also includes a second signal of a second type. If so, the flow proceeds to block 204. Otherwise, the flow returns to block 202 where the content player continues to operate.

At block 204, the electronic device determines whether or not the control device is currently paired with the electronic device. If so, the electronic device performs one or more operations indicated by the first signal and/or the second signal before the flow returns to block 202 where the electronic device continues to operate. Otherwise, the flow proceeds to block 206.

At block 206, after the electronic device determines that the control device is not currently paired with the electronic device, the processing unit displays a notification that the control device is not currently paired with the electronic device. This notification may indicate another electronic device with which the control device is currently paired. The flow then proceeds to block 207 where the electronic device displays a prompt to pair the control device with the electronic device.

The flow then proceeds to block 208 where the electronic device determines whether or not an affirmative response to the prompt to pair the control device with the electronic device is received. If not, the flow returns to block 202 where the electronic device continues to operate. Otherwise, the flow proceeds to block 209.

At block 209, after the electronic device determines that an affirmative response to the prompt to pair the control device with the electronic device is received, the electronic device notifies the currently paired other electronic device that the control device is to be paired with the electronic device. The other electronic device may transmit unpairing information to the control device, which may then unpair from the other electronic device. The electronic device may receive pairing information from the other electronic device and, at block 210, may pair the control device with the electronic device by transmitting the received pairing information to the control device (although in other implementations the other electronic device may transmit the pairing information directly to the control device) as well as any information for communicating with one or more components associated with the electronic device. The flow then returns to block 202 where the electronic device continues to operate.

Figure 3:
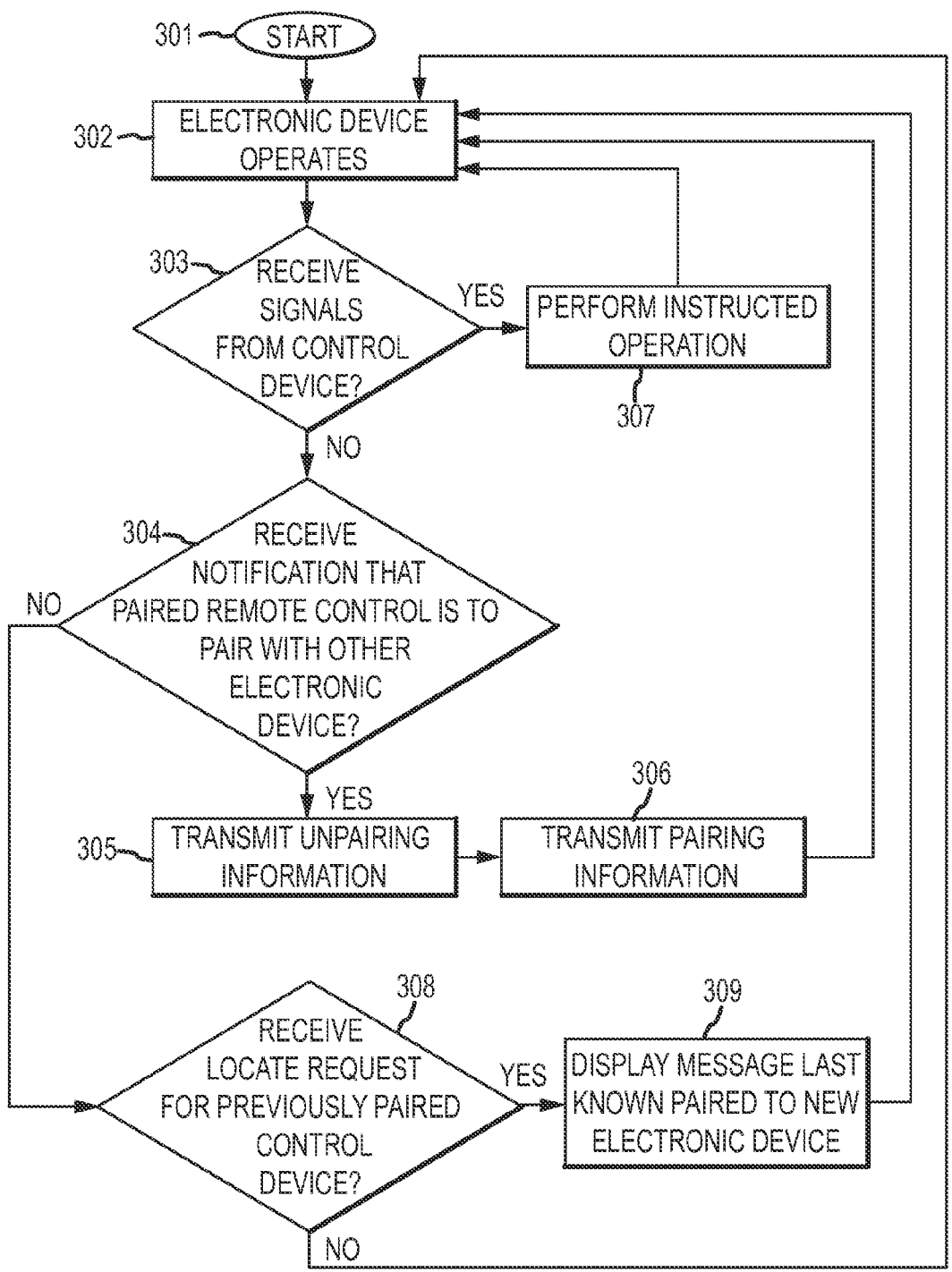
FIG. 3 is a flow chart illustrating a second example method for reconfiguring remote control devices for different electronic devices in a network. This method may be performed by the system of FIG. 1.

FIG. 3 illustrates a second example method 300 for reconfiguring remote control devices for different electronic devices in a network. The method 300 may be performed by the content player 101 of FIG. 1. The flow begins at block 301 and proceeds to block 302 where the electronic device (which may be the content player 101) operates. The flow then proceeds to block 303 where the electronic device determines whether or not a plurality of signals including a first signal of a first type and a second signal of a second type are received from a control device. If so, the flow proceeds to block 307 where the electronic device performs one or more operations indicated by the first signal and/or the second signal before the flow returns to block 302 where the electronic device continues to operate. Otherwise, the flow proceeds to block 304.

At block 304, the electronic device determines whether or not a notification is received that a control device that is currently paired with the electronic device is to pair with another electronic device. If so, the flow proceeds to block 305. Otherwise, the flow proceeds to block 308.

At block 305, after the electronic device determines that a notification is received that a control device that is currently paired with the electronic device is to pair with another electronic device, the electronic device transmits unpairing information to the control device and the control device utilizes such information to unpair from the electronic device. The flow then proceeds to block 306 where the electronic device transmits pairing information to the control device (which may be transmitted via the other electronic device) and the control device utilizes the information to pair with the other electronic device. Then, the flow returns to block 302 where the electronic device continues to operate.

At block 308, after the electronic device determines that a notification is not received that a control device that is currently paired with the electronic device is to pair with another electronic device, the electronic device determines whether or not a request to locate a control device that was previously paired with the electronic device is received. If so, the flow proceeds to block 309. Otherwise, the flow returns to block 302 and the electronic device continues to operate.

At block 309, after the electronic device determines that a request to locate a control device that was previously paired with the electronic device is received, the electronic device displays a message that the control device was paired to a new electronic device. The message may include one or more identifiers that identify the new electronic device. The flow then returns to block 302 and the electronic device continues to operate.

Figure 4:
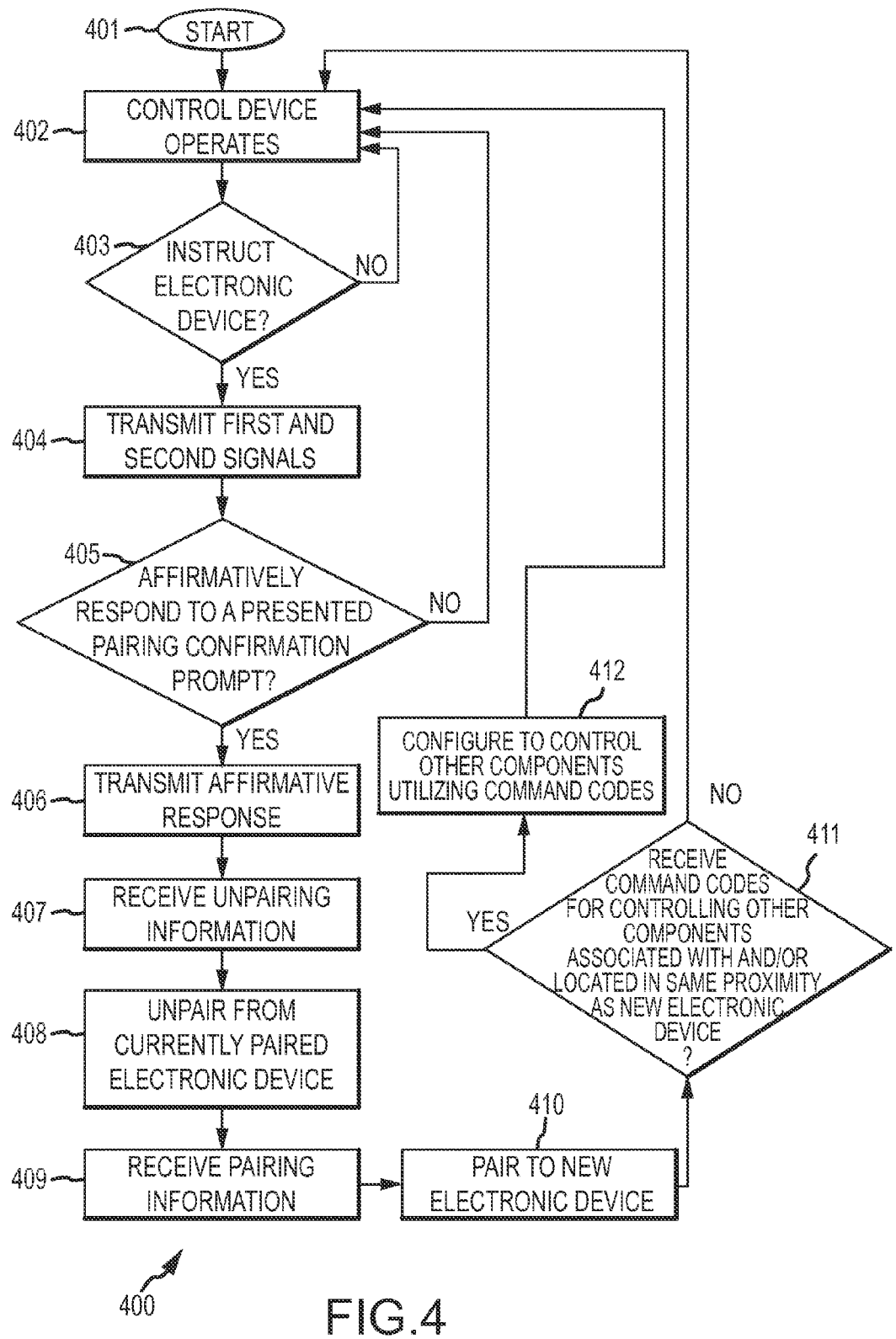
FIG. 4 is a flow chart illustrating a third example method for reconfiguring remote control devices for different electronic devices in a network. This method may be performed by the system of FIG. 1.

FIG. 4 illustrates a third example method 400 for reconfiguring remote control devices for different electronic devices in a network. The method 400 may be performed by the control device 102 of FIG. 1. The flow begins at block 401 and proceeds to block 402 where the control device operates. The flow then proceeds to block 203 where the processing unit 113 determines whether or not to transmit an instruction to a currently paired electronic device. The processing unit may determine to transmit the instruction to the currently paired electronic device in response to input received via the user interface component 116. If so, the flow proceeds to block 404. Otherwise, the flow returns to block 402 where the control device continues to operate.

At block 404, after the processing unit 113 determines to transmit the instruction to the currently paired electronic device, the processing unit transmits the instruction by transmitting a plurality of signals including a first signal of a first type and a second signal of a second type utilizing the communication component 115. The flow then proceeds to block 405.

At block 405, the processing unit 113 determines whether or not to respond affirmatively to a pairing confirmation prompt displayed by an electronic device. The processing unit may make this determination based on whether or not an electronic device has displayed such a message, indicating that the electronic device has received the first signal and is not currently paired with the control device 102. The processing unit may also make this determination in response to input received via the user interface component 116. If not, the flow returns to block 402 where the control device continues to operate. Otherwise, the flow proceeds to block 406.

At block 406, after the processing unit 113 determines to respond affirmatively to a pairing confirmation prompt displayed by an electronic device, the processing unit transmits the affirmative response via the communication component 115. The flow then proceeds to block 407 where the processing unit receives unpairing information via the communication component from the electronic device with which the control device 102 is currently paired. Next, the flow proceeds to block 408 where the processing unit utilizes the unpairing information to unpair from the currently paired electronic device and the flow proceeds to block 409. At block 409, the processing unit receives pairing information from the electronic device with which the control device was previously paired via the communication component. Then, the flow proceeds to block 410 where the processing unit utilizes the pairing information to pair with the electronic device before the flow proceeds to block 411.

At block 411, the processing unit 113 determines whether or not one or more command codes for one or more other components associated with and/or located in the same proximity as the new electronic device. If not, the flow returns to block 402 and the control device 102 continues to operate. Otherwise, the flow proceeds to block 412 where the processing unit utilizes the command codes to configure the control device to control the other components before the flow returns to block 402 and the control device continues to operate.

Figure 5B:
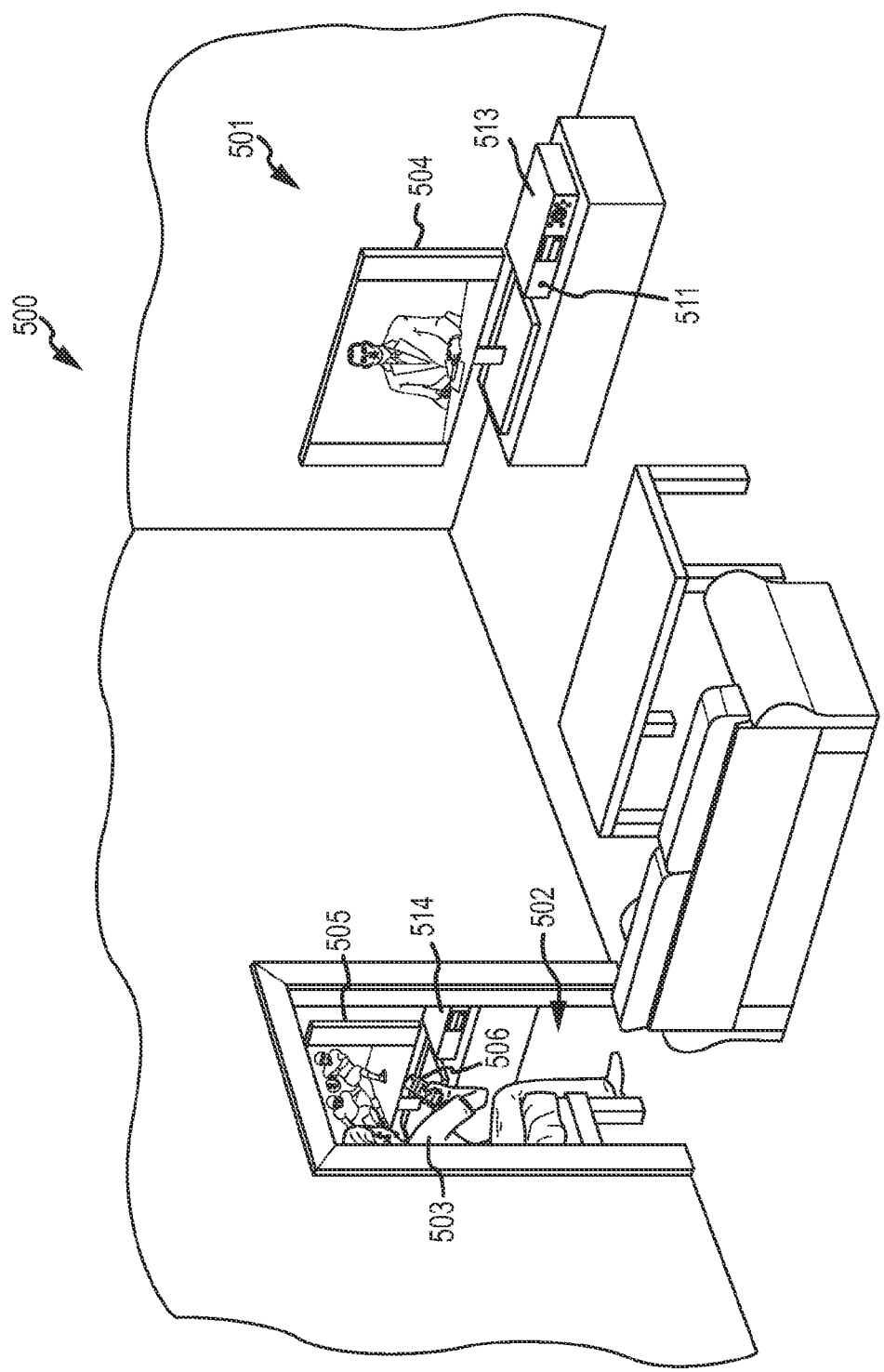

FIGS. 5A-5H illustrate a user 503 utilizing a system 500 for reconfiguring remote control devices for different electronic devices in a network. The system 500 may be the system 100 of FIG. 1. As illustrated in FIG. 5A, a user 503 is watching a news program displayed on a television 504 by a set top box 513 in a living room 501. The user is holding a remote control 506 that is paired to the living room set top box. Also as illustrated, a bedroom 502 is next door to the living room and the bedroom contains a set top box 514 that is displaying a sporting event on a television 505.

Figure 5C:
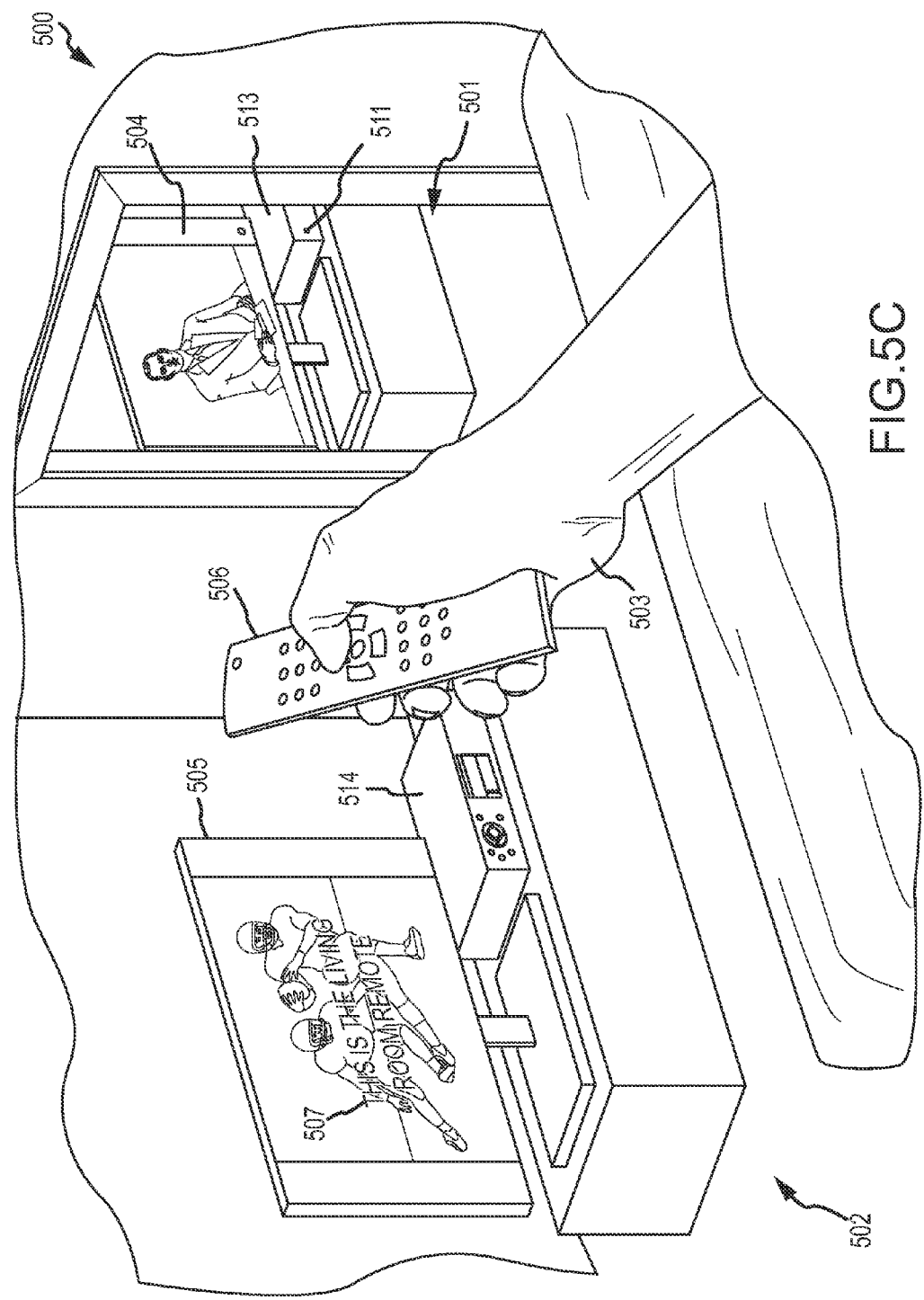
Figure 5D:
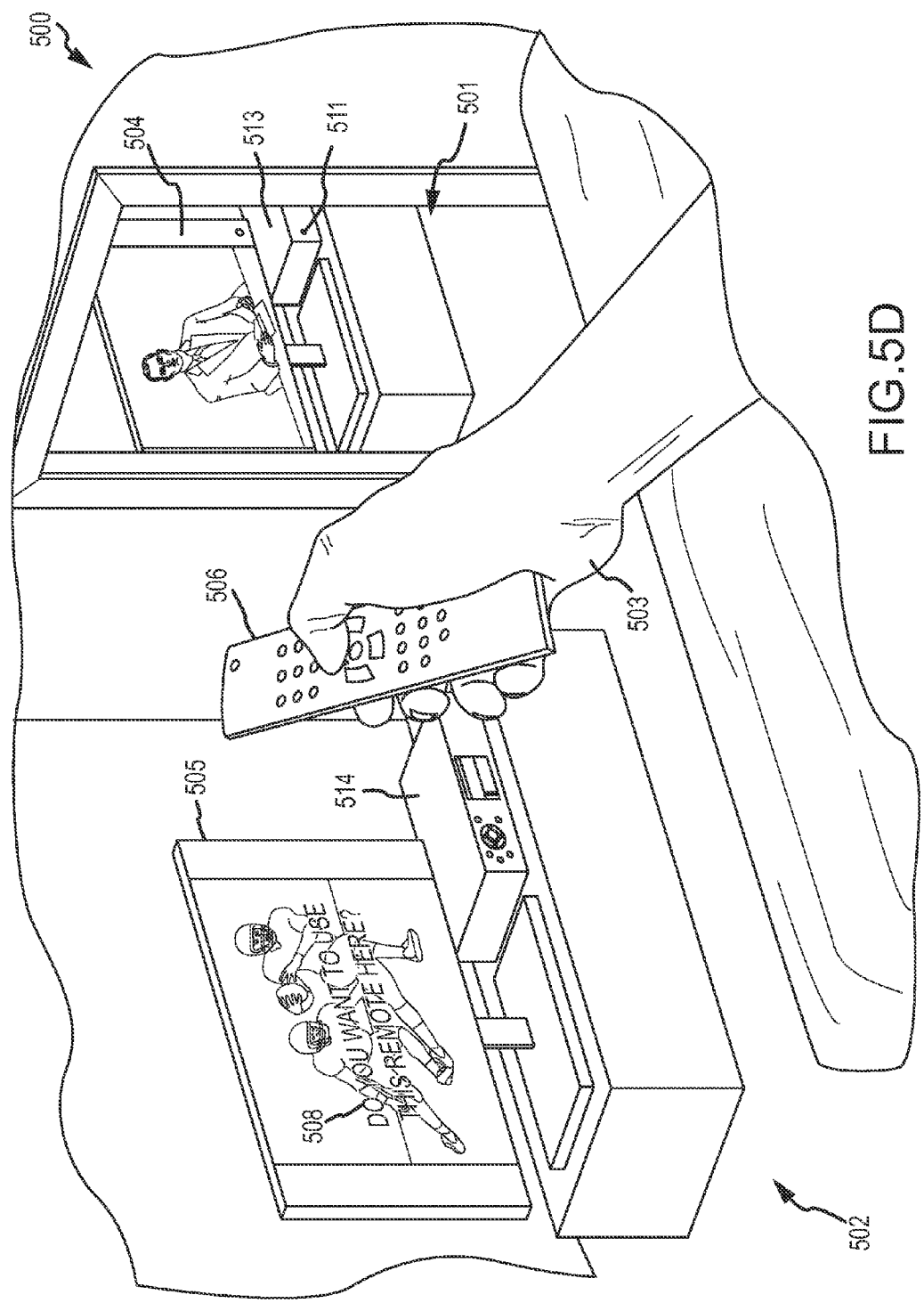

In FIG. 5B, the user 503 moves to the bedroom 502 and attempts to utilize the remote control 506 to control the bedroom set top box 514 to display the news program. In response, the remote control transmits a plurality of signals including an IR signal and a RF signal corresponding to the instruction. However, as the user is in the bedroom, the IR signal is received by the bedroom set top box instead of the living room set top box 513 and the living room set top box receives the RF signal. In response to receiving the IR signal, the bedroom set top box determines that the remote control is paired with the living room set top box and displays a message 507 accordingly, as illustrated in FIG. 5C. As illustrated in 5D, the bedroom set top box then displays a message 508 asking the user if the user wants to pair the remote control with the bedroom set top box.

If the user 503 utilizes the remote control 506 to respond negatively to the message 508, the bedroom set top box 514 returns to displaying the sports program as illustrated in FIG. 5B. However, if the user 503 utilizes the remote control to respond affirmatively to the message 508, the bedroom set top box transmits a notification of such to the living room set top box 513. The living room set top box transmits unpairing information to the remote control and the remote control unpairs from the living room set top box. The living room set top box then transmits pairing information to the remote control via the bedroom set top box and the remote control pairs with the bedroom set top box.

Figure 5E:
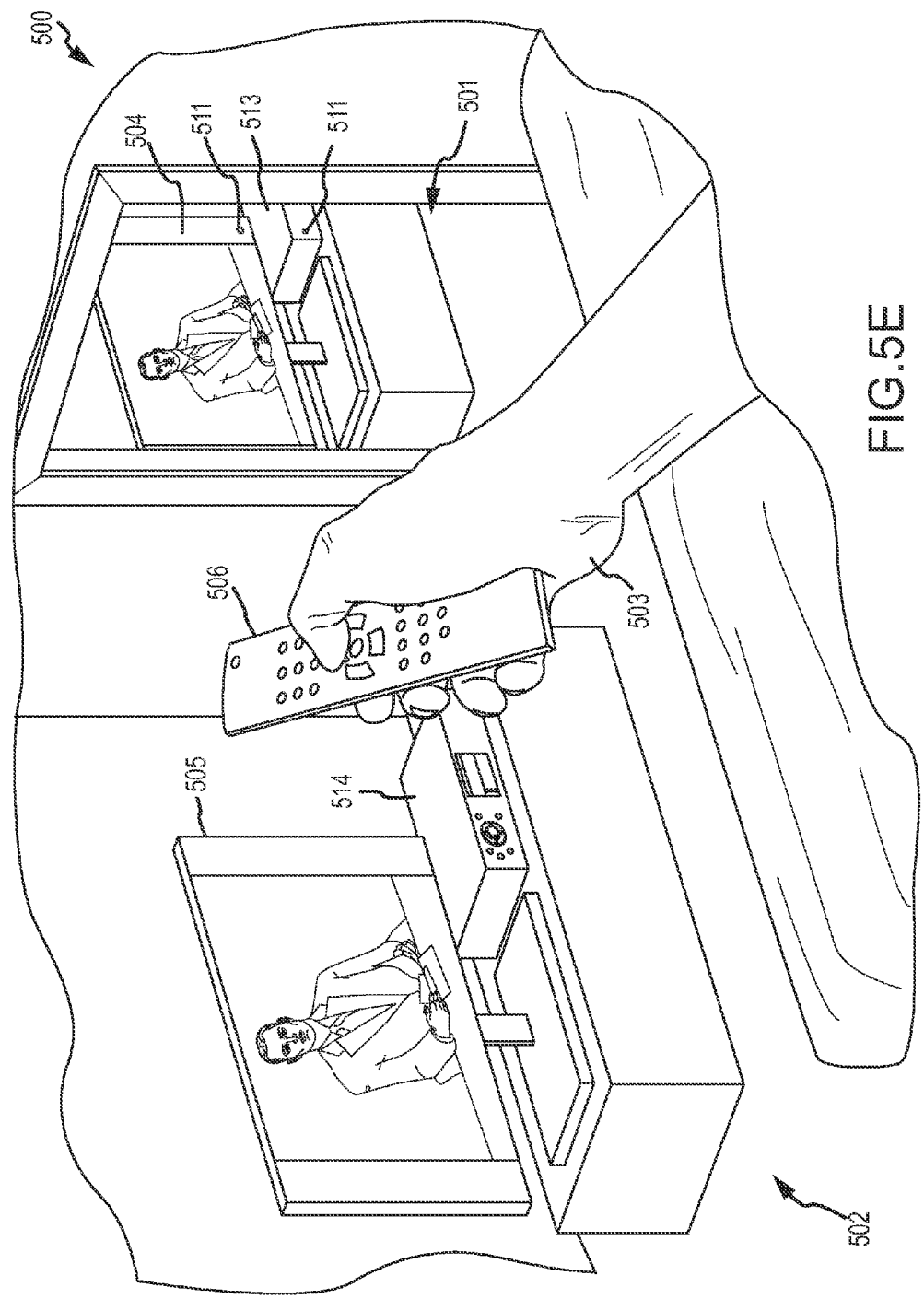

Subsequently, the user 503 may again attempt to utilize the remote control 506 to control the bedroom set top box 514 to display the news program. As the bedroom set top box is now paired with the remote control, the bedroom set top box switches channels to display the news program, as illustrated in FIG. 5E.

Figure 5F:
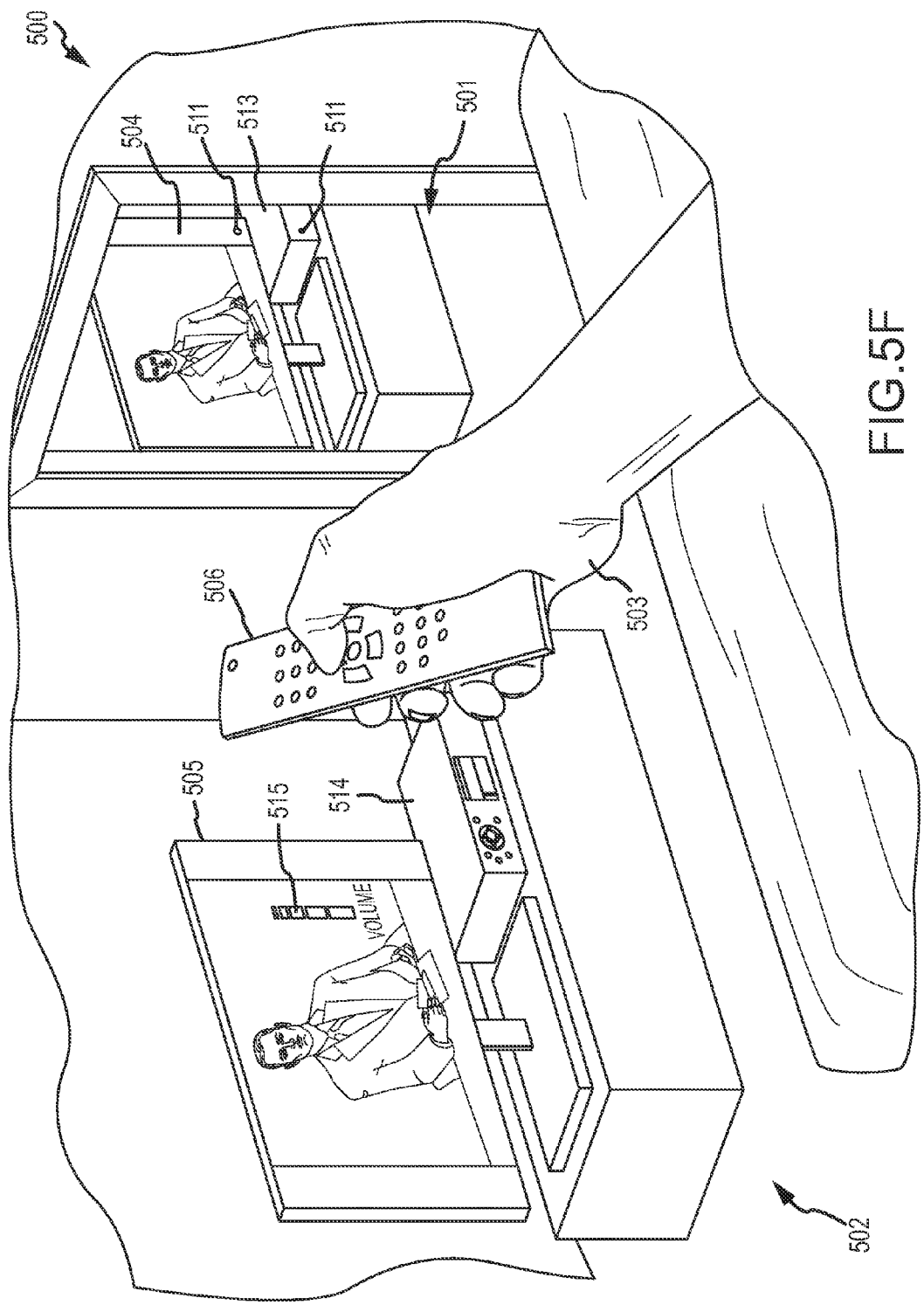

When pairing with the remote control 506, the bedroom set top box 514 may also transmit one or more control codes for controlling the bedroom television 505 to the remote control. Upon receipt of the one or more control codes, the remote control may configure itself to control the bedroom television as well as the bedroom set top box. For example, as illustrated in FIG. 5F, the remote control may be utilized to control the volume on the bedroom television as well as switching the channel displayed by the bedroom set top box.

Figure 5G:
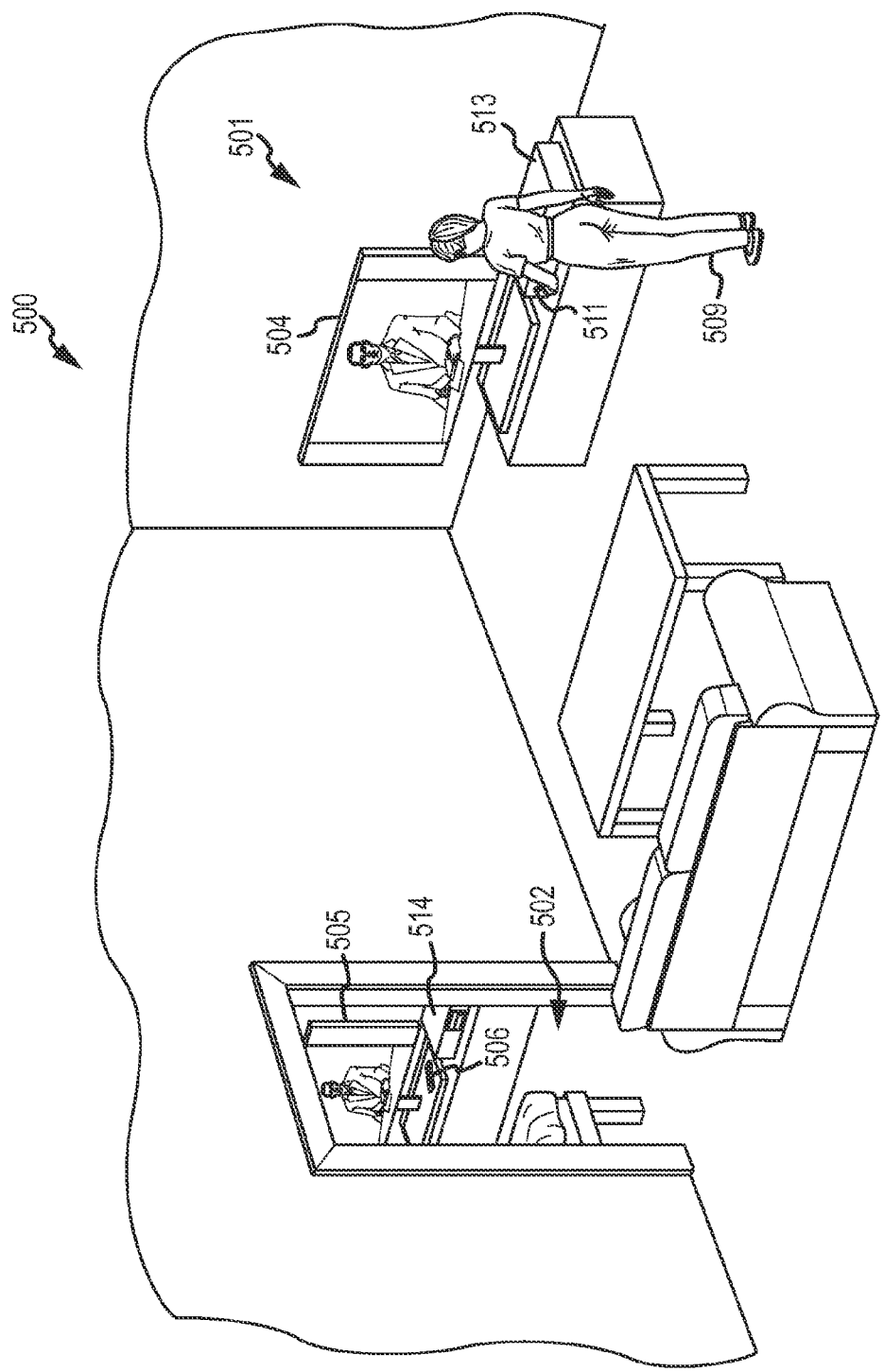
Figure 5H:
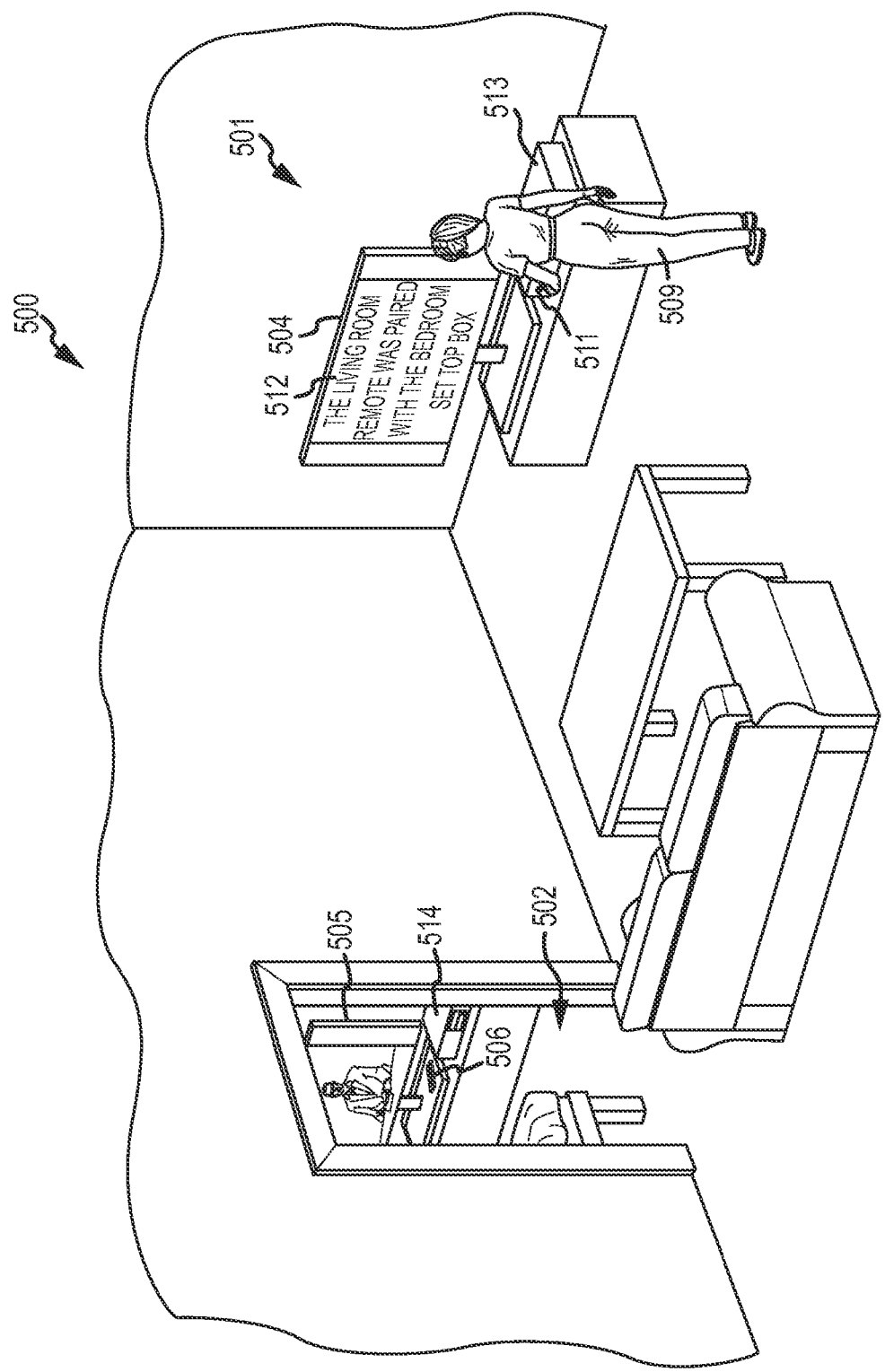

After the user 503 departs, as illustrated in FIG. 5G, another user 509 enters the living room 501. Unable to find the remote 506, the user 509 presses a "remote locate" button 511 on the living room set top box 513. The living room set top box determines that the last communication that the living room set top box had with the remote was the unpairing/pairing sequence above and displays a message 512 indicating that the remote control was paired with the bedroom set top box 514, as illustrated in FIG. 5H. As illustrated in FIG. 5I, the user 509 then goes to the bedroom 502 and locates the remote control.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for reconfiguring remote control devices for different electronic devices in a network, the method comprising:

receiving a first signal of a first type at a first electronic device of a network of a plurality of electronic devices wherein the first signal is transmitted by a remote control device as part of transmitting a first plurality of signals, including the first signal and a second signal of a second type that are transmitted, to the first electronic device of the network of the plurality of electronic devices that is paired with the remote control device, the first plurality of signals instructs the first electronic device to perform at least one operation;

receiving a notification at the first electronic device from a second electronic device of the network of the plurality of electronic device that the remote control device will be paired with the second electronic device wherein the second electronic device received the second signal of the second type and identified the first electronic device by looking up at least one identifier included in the second signal of the second type in at least one database shared by the first electronic device and the second electronic device, the second electronic device having received a confirmation in response to a prompt to pair the remote control device with the second electronic device;

in response to the notification, transmitting at least one message from the first electronic device to the remote control device instructing the remote control device to unpair from the first electronic device;

transmitting information to pair the remote control device with the second electronic device from the first electronic device to the remote control device;

receiving a request at the first electronic device to locate the remote control device;

determining that the first electronic device last communicated regarding the remote control device when transmitting the information to pair the remote control device with the second electronic device; and in response to determining that the first electronic device last communicated regarding the remote control device when transmitting the information to pair the remote control device with the second electronic device, transmitting at least one message from the first electronic device to at least one display device indicating that the remote control device was paired with the second electronic device.

2. The method of claim 1, wherein said operation of transmitting information to pair the remote control device with the second electronic device from the first electronic device to the remote control device further comprises transmitting the information from the first electronic device to the remote control device via the second electronic device.

3. A system for reconfiguring remote control devices for different electronic devices in a network, comprising:

a first electronic device of a network of a plurality of electronic devices, comprising:
at least one communication component comprising at least one receiving component of a first type and at least one receiving component of a second type; and
at least one processing unit;

wherein the at least one processing unit:

receives a first signal of a first type via the at least one communication component wherein the first signal is transmitted by a remote control device as part of transmitting a first plurality of signals, including the first signal and a second signal of a second type that are transmitted, to a second electronic device of the network of the plurality of electronic devices that is paired with the remote control device that instructs the second electronic device to perform at least one operation;

in response to receiving the first signal of the first type, looks up at least one identifier included in the first signal of the first type in at least one database shared by the first electronic device and the second electronic device;

determines, in response to looking up the at least one identifier, that the remote control device is paired with the second electronic device;

transmits at least one prompt via the at least one communication component to at least one display device requesting confirmation to pair the remote control device with the first electronic device;

upon receipt of the confirmation from the remote control device, transmits a notification via the at least one communication component to the second electronic device that the remote control device will be paired with the first electronic device;

pairs the remote control device with the first electronic device receives a request to locate the remote control device;

determines that the first electronic device last communicated regarding the remote control device when transmitting information to pair the remote control device with at least one of the first electronic device and the second electronic device; and in response to determining that the first electronic device last communicated regarding the remote control device when transmitting information to pair the remote control device with at least one of the first electronic device and the second electronic device, transmits at least one message to the at least one display device indicating that the remote control device was paired with at least one of the first electronic device and second electronic device.

4. The system of claim 3, further comprising the second electronic device comprising at least one second device communication component and at least one second device processing unit wherein the at least one second device processing unit:

receives the second signal of the second type and the notification via the at least one second device communication component, transmits at least one message to the remote control device instructing the remote control device to unpair from the second electronic device, and transmits information to pair the remote control device with the first electronic device to the remote control device.

5. The system of claim 4, wherein the at least one second device processing unit transmits the information to the remote control device via the first electronic device.

6. The system of claim 5, wherein the at least one processing unit pairs the remote control device with the first electronic device by transmitting the information received from the second electronic device to the remote control device via the at least one communication component along with at least one command code for at least one component associated with the first electronic device.

7. The system of claim 3, wherein the at least one prompt includes at least one indicator indicating that the remote control device is paired with the second electronic device.

8. The system of claim 3, wherein the at least one processing unit receives a second plurality of signals, including a third signal of the first type and a fourth signal of the second type, from the remote control device via the at least one communication component wherein the second plurality of signals instructs the first electronic device to perform at least one operation.

9. The system of claim 3, wherein the at least one processing unit determines that the remote control device is paired with the second electronic device by determining that an electronic device of the network of the plurality of electronic devices other than the first electronic device received the second signal of the second type.

10. A remote control device, comprising:
at least one communication component comprising at least one transmitting component of a first type and at least one transmitting component of a second type; and
at least one processing unit that is communicably coupled to the at least one communication component;
wherein the processing unit:
transmits a plurality of signals including at least a first signal of a first type and a second signal of a second type via the at least one communication component to a first electronic device of a network of a plurality of electronic devices to instruct the first electronic device to perform at least one operation wherein the first signal and the second signal are transmitted, the first signal of the first type is received by a second electronic device of the network of the plurality of electronic devices instead of the first electronic device and in response to receiving the first signal of the first type, the second electronic device identifies the first electronic device by looking up at least one identifier included in the first signal of the first type in at least one database shared by the first electronic device and the second electronic device,
sends a confirmation via the at least one communication component in response to a prompt presented by the second electronic device confirming to pair the remote control device with the second electronic device,
receives at least one message via the at least one communication component to unpair from the first electronic device,
receives information via the at least one communication component to pair with the second electronic device, and
utilizes the information to pair with the second electronic device, wherein a location of the remote control device is identified by the first electronic device by at least receiving a request to locate the remote control device, determining that the first electronic device last communicated regarding the remote control device when transmitting the information to pair the remote control device with at least one of the first electronic device and second electronic device, and in response to determining that the first electronic device last communicated regarding the remote control device when transmitting the information to pair the remote control device with at least one of the first electronic device and second electronic device, transmitting at least one message to the at least one display device indicating that the remote control device was paired with at least one of the first electronic device and second electronic device.

11. The remote control device of claim 10, wherein the first signal of the first type comprises at least one infrared signal and the second signal of the second type comprises at least one radio frequency signal.

12. The remote control device of claim 10, wherein the processing unit transmits an additional plurality of signals including at least a third signal of the first type and a fourth signal of the second type via the at least one communication component to the second electronic device to instruct the second electronic device to perform at least one additional operation.

* * * * *